US010075848B2

(12) United States Patent
Velusamy et al.

(10) Patent No.: US 10,075,848 B2
(45) Date of Patent: Sep. 11, 2018

(54) SIM LEVEL MOBILE SECURITY (71) Applicant: T-Mobile USA, Inc., Bellevue, WA (US)

(72) Inventors: Senthil Kumar Mulluppadi Velusamy, Bellevue, WA (US); Steven S. Farsai, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 80 days.

(21) Appl. No.: 13/796,550

(22) Filed: Mar. 12, 2013

(65) Prior Publication Data
US 2014/0057597 A1 Feb. 27, 2014

Related U.S. Application Data (60) Provisional application No. 61/693,255, filed on Aug. 25, 2012.

(51) Int. Cl.
*H04M 1/66* (2006.01)
*H04W 12/08* (2009.01)
*H04W 12/12* (2009.01)

(52) U.S. Cl.
CPC ........... *H04W 12/08* (2013.01); *H04W 12/12* (2013.01)

(58) Field of Classification Search
CPC .............................. H04W 12/08; H04W 12/12
See application file for complete search history.

(56) References Cited

U.S. PATENT DOCUMENTS

| 6,226,749 | B1 | 5/2001 | Carloganu et al. |
| 6,317,836 | B1 | 11/2001 | Goren et al. |
| 6,321,079 | B1 | 11/2001 | Cooper |
| 6,327,660 | B1 | 12/2001 | Patel |
| 7,689,204 | B2 | 3/2010 | Dupuis et al. |
| 9,055,443 | B2 | 6/2015 | Froelich et al. |
| 9,172,538 | B2 | 10/2015 | Obaidi |

(Continued)

FOREIGN PATENT DOCUMENTS

| CN | 1331371 | 8/2007 |
| CN | 101398872 A | 4/2009 |

(Continued)

OTHER PUBLICATIONS

Lee, et al., "A New Delegation-Based Authentication Protocol for Use in Portable Communication Systems", IEEE Transactions on Wireless Communications, vol. 4, No. 1, Jan. 2005, pp. 57-64.

(Continued)

*Primary Examiner* — Wayne H Cai
(74) *Attorney, Agent, or Firm* — Lee & Hayes, PLLC (57) ABSTRACT

Mobile security techniques may protect information stored on a subscriber identity module (SIM) card as well as services that are accessible through the SIM card from unauthorized use. The techniques include receiving a service request to perform a security function at a server. The security function may affect a service provided to a mobile device by a telecommunication network, in which the mobile device obtains the service using a SIM card. The techniques further include performing the security function. The performance of the SIM function may be terminated in response to the server receiving a reversion command or an expiration of a predetermined time period.

18 Claims, 6 Drawing Sheets

(56) References Cited

U.S. PATENT DOCUMENTS

| | | | |
|---|---|---|---|
| 9,319,884 B2 | 4/2016 | Buzescu et al. | |
| 9,591,484 B2 | 3/2017 | Ionescu et al. | |
| 2005/0172135 A1 | 8/2005 | Wiersma | |
| 2006/0075259 A1 | 4/2006 | Bajikar et al. | |
| 2007/0072620 A1* | 3/2007 | Levitan | H04W 4/02 455/456.1 |
| 2007/0154014 A1 | 7/2007 | Aissi et al. | |
| 2007/0180269 A1 | 8/2007 | Irish et al. | |
| 2007/0264990 A1* | 11/2007 | Droste | H04W 88/02 455/418 |
| 2008/0090614 A1 | 4/2008 | Sicher et al. | |
| 2008/0132226 A1* | 6/2008 | Carnall | 455/425 |
| 2008/0209206 A1 | 8/2008 | Vaha-Sipila et al. | |
| 2008/0229092 A1 | 9/2008 | Dale et al. | |
| 2008/0282084 A1 | 11/2008 | Hatakeyama | |
| 2008/0307494 A1 | 12/2008 | Holtzman et al. | |
| 2009/0083858 A1 | 3/2009 | Jennings et al. | |
| 2009/0158419 A1 | 6/2009 | Boyce | |
| 2009/0165119 A1* | 6/2009 | Ramanath | 726/17 |
| 2009/0270126 A1* | 10/2009 | Liu | G06F 21/88 455/558 |
| 2009/0325646 A1* | 12/2009 | Stewart et al. | 455/567 |
| 2010/0082968 A1 | 4/2010 | Beverly | |
| 2010/0263043 A1 | 10/2010 | Xu | |
| 2010/0273452 A1* | 10/2010 | Rajann et al. | 455/411 |
| 2010/0299744 A1 | 11/2010 | Mardiks | |
| 2011/0076986 A1* | 3/2011 | Glendinning et al. | 455/411 |
| 2011/0081889 A1 | 4/2011 | Gao et al. | |
| 2011/0130117 A1 | 6/2011 | Fan et al. | |
| 2011/0130118 A1 | 6/2011 | Fan et al. | |
| 2011/0159843 A1 | 6/2011 | Heath et al. | |
| 2011/0212706 A1* | 9/2011 | Uusilehto | H04M 1/72572 455/411 |
| 2011/0307711 A1 | 12/2011 | Novak et al. | |
| 2012/0042376 A1 | 2/2012 | Dolgunov et al. | |
| 2012/0042396 A1* | 2/2012 | Guerra | G06F 21/88 726/30 |
| 2012/0058743 A1 | 3/2012 | Chen | |
| 2012/0083242 A1 | 4/2012 | Spitz et al. | |
| 2012/0101941 A1* | 4/2012 | Kang et al. | 705/40 |
| 2013/0078951 A1* | 3/2013 | Mun | G06F 21/305 455/411 |
| 2013/0304616 A1 | 11/2013 | Raleigh et al. | |
| 2013/0326643 A1* | 12/2013 | Pai | G06F 21/88 726/35 |
| 2016/0029220 A1 | 1/2016 | Obaidi | |

FOREIGN PATENT DOCUMENTS

| | | |
|---|---|---|
| EP | 1359733 A1 | 11/2003 |
| EP | 2063378 | 5/2009 |
| WO | WO2004063871 A2 | 7/2004 |
| WO | WO2008077628 A2 | 7/2008 |
| WO | WO2013158977 | 10/2013 |

OTHER PUBLICATIONS

Office Action for U.S. Appl. No. 13/660,350, dated Jul. 22, 2013, Obaidi, "Mobile Device-Type Locking", 8 pages.
PCT Search Report and Written Opinion dated Jul. 1, 2013 for PCT Application No. PCT/US13/37345, 10 pages.
PCT Search Report and Written Opinion dated Jul. 30, 2013 for PCT Application No. PCT/US13/37332, 13 pages.
Office action for U.S. Appl. No. 13/840,045, dated Jul. 30, 2014, Buzescu et al., "Remote Unlocking of Telecommunication Device Functionality", 11 pages.
Office action for U.S. Appl. No. 13/660,350, dated Aug. 7, 2014, Froelich et al., "Mobile Device-Type Locking", 8 pages.
Final Office Action for U.S. Appl. No. 13/660,350, dated Jan. 13, 2014, Ahmad Arash Obaidi, "Mobile Device-Type Locking", 8 pages.
PCT Search Report and Written Opinion dated Jan. 17, 2013 for PCT Application No. PCT/US12/62050, 10 pages.
PCT Search Report and Written Opinion dated Sep. 17, 2013 for PCT Application No. PCT/US13/37381, 11 pages.
Final Office Action for U.S. Appl. No. 13/840,045, dated Nov. 17, 2014, Adrian Buzescu, "Remote Unlocking of Telecommunication Device Functionality", 12 pages.
Office Action for U.S. Appl. No. 13/842,116, dated Jan. 27, 2015, Ahmad Arash Obaidi, "Secure Lock for Mobile Device", 7 pages.
Office Action for U.S. Appl. No. 13/839,189, dated Feb. 24, 2015, Alexandru Catalin Ionescu, "Secure Environment for Subscriber Device", 8 pages.
Extended European Search Report dated Nov. 27, 2015 for European patent application No. 13778691.9, 9 pages.
Extended European Search Report dated May 20, 2015 for European Patent Application No. 12843678.9, 8 pages.
Office action for U.S. Appl. No. 13/840,045, dated Jul. 29, 2015, Buzescu et al., "Remote Unlocking of Telecommunication Device Functionality", 10 pages.
Office action for U.S. Appl. No. 13/839,189, dated Aug. 21, 2015, Ionescu et al., "Secure Environment for Subscriber Device", 7 pages.
Extended European Search Report dated Nov. 11, 2015 for European patent application No. 1377892238, 6 pages.
Chinese Office Action dated Feb. 26, 2016 for Chinese patent application No. 201280053062.8, a counterpart foreign application of U.S. Pat. No. 9,055,443.
Office Action for U.S. Appl. No. 14/874,023, Obaidi, dated Dec. 21, 2015, 7 pages.
Office action for U.S. Appl. No. 13/839,189, dated Dec. 23, 2015, Ionescu et al., "Secure Environment for Subscriber Device", 14 pages.
Office action for U.S. Appl. No. 13/839,189, dated Jul. 11, 2016, Ionescu et al., "Secure Environment for Subscriber Device", 15 pages.
Chinese Office Action dated Jun. 2, 2017 for Chinese patent application No. 201380020694.9, a counterpart foreign application of U.S. Pat. No. 9,319,884.
Barriga, L., et al., "M2M Remote-Subscription Management", Ericsson Review, May 2011, 6 pages.
Cartes 2012 Demo Presentation, Giesecke and Devrient, retrieved Jun. 16, 2016 from <<https://www.gi-de.com/gd_media/media/documents/complementary_material/events_1/04_STE_CARTES_Demo_Presentation.pdf>>, 9 pages.
"Device Management Architecture", Open Mobile Alliance, Feb. 2016, pp. 13-23, 30-32, 45-53, 93-99.
Kanonov, U., "Secure Containers in Android: the Samsung KNOX Case Study", arXiv:1605.08567, May 27, 2016, pp. 1-19.
"OMA Device Management Protocol", Open Mobile Alliance, Feb. 2016, pp. 7-16.
"Sim lock", Wikipedia, retrieved Jun. 30, 2017, from <<https://en.wikipedia.org/w/index.php?title=SIM_lock&oldid=715512588>>, pp. 1-12.
"Subscriber Identity Module", Wikipedia, retrieved Jun. 17, 2017, from <<https://en.wikipedia.org/w/index.php?title=Subscriber identity_module&oldid=712259654>>, pp. 1-12.

* cited by examiner

SIM LEVEL MOBILE SECURITY

CROSS REFERENCE TO RELATED APPLICATION

This application claims priority to U.S. Provisional Patent Application No. 61/693,255 to Velusamy et al., entitled "SIM Level Mobile Security", filed on Aug. 25, 2012, and incorporated herein by reference.

BACKGROUND

As mobile devices such as smart phones and laptops increase in functionality, users are becoming more reliant on these devices. For example, smart phones are not limited to providing communications such as voice, short text messaging, internet browsing, and electronic mail. Smart phones also provide access to applications ranging from streaming multimedia, bar code scanning, and identity services. As functionality of mobile devices increase, mobile devices store and otherwise provide access to an increasing amount of personal data. Smart phones may store personal documents, photos, audio files and videos. Further, smart phones may provide client access to secure data stored in servers on personal or enterprise networks, or on the cloud.

However, mobile devices by their very form factor may be misplaced, stolen, or otherwise lost. In those situations, a user is not only deprived of a tool that the user relies on, but also personal data. There are presently techniques to assist in mobile device recovery, but these techniques may be circumvented at the Subscriber Identity Module (SIM) card level. For example, a malicious person may take out the SIM card in one mobile device, and place the SIM card in another mobile device in order to continue using services associated with the stolen SIM card. In another example, it may be possible for the malicious person to use information stored in the SIM card to contact customer service or obtain a mobile device owner's account password to circumvent any remote lockout activated on the mobile device by the mobile device owner.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques for implementing Subscriber Identity Module (SIM) Level mobile security to secure the SIM card of a mobile device. Some techniques to handle scenarios in which a mobile device is lost or stolen may focus on the mobile device. For example, a mobile device may be locked by remote command, such that a lock screen on the mobile device may only be bypassed with the input of correct authentication credentials into the mobile device. Alternatively, a mobile device may be remotely triggered to sound an alarm, even if the ringer of the mobile device has been turned off, allowing a user to locate the mobile device via sound. In another example, the lost or stolen mobile device may be geolocated via a web page, so that the user may initiate steps to recover the mobile device. In extreme circumstances, a user of the lost or stolen may remotely delete sensitive files stored in pre-specified memory locations on the mobile device in order to secure data privacy.

However, such techniques do not secure the SIM card of the lost or stolen mobile device. For example, a malicious person who is in possession of the mobile device may remove the SIM card from the lost or stolen mobile device, and then place the SIM card in a another mobile device to access services through the still active SIM card. For example, the malicious person may make phone calls or send text messages using the available services. In another example, it may be possible for the malicious person to use information stored in the SIM card to contact customer service or obtain a mobile device owner's account credentials and other sensitive information using another mobile device. The malicious person may then use that information to defeat the lockout on the lost or stolen mobile device.

The SIM level mobile security techniques provide features that secure the SIM card of a lost or stolen mobile device from unauthorized use. The techniques may include the activation of a telecommunication network service to redirect incoming calls for the user associated with the SIM card to an alternative telephone number. In this way, the user will not miss telephone calls due to the loss or theft of the mobile device. The techniques may also include the activation of telecommunication network services to restrict incoming calls to and/or outgoing calls from a mobile device that is accessing the telecommunication network through the SIM card. Likewise, other techniques may include activation of telecommunication network services to block incoming text messages to and/or outgoing text messages from a mobile device that is accessing the telecommunication network through the SIM card. Another technique that provides SIM level mobile security may be remotely changing a locking state of the SIM card so that SIM card is protected by an authorization credential (e.g., a personal identifier number). Accordingly, the SIM card may cause a mobile device to prompt for the authorization credential prior to initiating a service that is provided via the SIM card.

Thus, by using both the SIM level mobile security techniques and mobile device-based security techniques, a user of a lost or stolen mobile device may not only protect the lost or stolen hardware and the hardware-stored data, but also information that is stored in the SIM card. Further, the user may be further assured that the information stored in the SIM card cannot be used by a malicious user to access telecommunication network services or obtain additional sensitive data related to the user.

Overview

Figure 1:
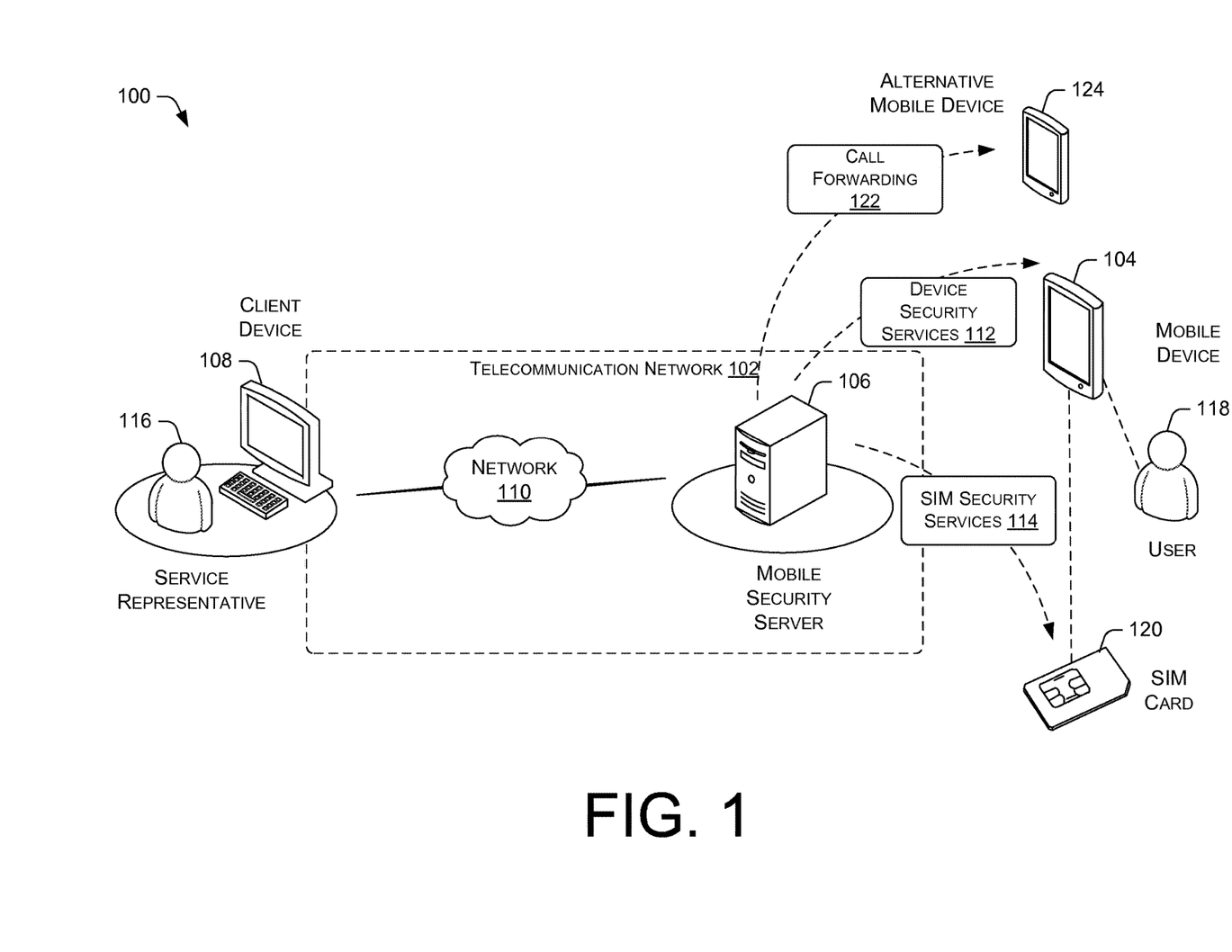
FIG. 1 is a block diagram showing an illustrative environment for implementing Subscriber Identity Module (SIM) level mobile security and mobile device level security to secure the data and device integrity of a lost or stolen mobile device.

FIG. 1 is a block diagram showing an illustrative environment 100 for implementing SIM level mobile security and mobile device level security to secure the data and device integrity of a lost or stolen mobile device. The environment 100 may include a telecommunication network 102 that is operated by a telecommunication carrier. The telecommunication network 102 may include base stations and a core network. The base stations may handle traffic and signals between electronic devices, such as the mobile device 104, and the core network of the telecommunication network 102. For example, a base station may perform the transcoding of speech channels, allocation of radio channels to electronic device, paging, transmission and reception of voice and data, as well as other functions. The mobile device 104 may be a smart phone, a tablet computer, a laptop computer, a personal digital assistant (PDA), or any other portable electronic device that is equipped with cellular communication components that enable the mobile device to exchange voice and digital data with the telecommunication network.

The core network of the telecommunication network 102 may be responsible for routing voice communication to other telecommunication networks, as well as routing data communication to external packet switched networks, such as the Internet. For example, the core network may include a Gateway GPRS Support Node (GGSN) or another equivalent service node. The core network may further include a mobile security server 106. The mobile security server 106 may be part of a service node or communicatively coupled to a service node of the core network.

A client device 108 may communicate with the mobile security server 106 via a network 110. The client device 108 may be smart phone, a PDA, a netbook, a laptop computer, a desktop computer, and/or another electronic device that is capable of sending or receiving voice or data via the network 110. The network 110 may be a local area network ("LAN"), a larger network such as a wide area network ("WAN"), and/or a collection of networks, such as the Internet. Protocols for network communication, such as TCP/IP, may be used to implement the network 110. The network 110 may be implemented using various wireless communication interface technology (e.g., cellular, Wi-Fi, Ultrawideband, Bluetooth, satellite transmissions), and/or the like. Alternatively or concurrently, the network 110 may also be implemented using various wired communication technology, such as LAN Ethernet, WAN Ethernet, a universal serial bus (USB), a high speed serial bus, and/or the like.

The mobile security server 106 may provide device security services 112 and SIM level security services 114. The mobile security server 106 may be initiated to provide such services via the client device 108. The mobile security server 106 may provide a user interface page that is accessible through the client device 108. The user interface page may enable a service representative 116 to selectively activate one or more of the device security services 112 and the SIM level security services 114. In some embodiments, the client device 108 may be a client device that is located at a service call center of telecommunication carrier that operates the telecommunication network 102. In other embodiments, the client device 108 may be a client device that is located at a physical service or retail location operated by the telecommunication carrier.

The device security services 112 may affect the mobile device 104. In various embodiments, a device security service initiated by the mobile security server 106 may cause the mobile device 104 to sound an audible alarm. Another device security service may cause a geolocation of the mobile device 104 to be displayed at the client device 108 or at another mobile device. The device security services 112 may also include a service that triggers a remote locking of the mobile device 104, such that features of the mobile device 104 may be accessed upon the input of authorized credentials into the mobile device 104. Additional device security services may include remotely triggering the deletion of information from pre-specified memory locations of the mobile device 104, or triggering the mobile device 104 to display a message to a person in possession of the mobile device 104. For example, the message may request that the person contact the user 118 to arrange for a return of the mobile device 104.

The mobile device 104 may include a SIM card 120 that is removably installed on the mobile device 104. The SIM card 120 may be in the form of an integrated circuit that securely stores information that enables a mobile device to access services provided by a telecommunication network, such as the telecommunication network 102. In various embodiments, the SIM card 120 may store the International mobile subscriber identity (IMSI) associated with the user 118. The SIM card 120 may also store a unique serial number, as well as security authentication and ciphering information for authenticating the user 118 to the telecommunication network 102. A list of services provided by the telecommunication network 102 that is accessible to the user 118 may be stored in the SIM card 120. The SIM card 120 may further store a PIN and a personal unblocking code (PUK). In some embodiments, the SIM card 120 may additionally store credential information (e.g., a password) that the user 118 employs to access a subscriber account with the telecommunication carrier that operates the telecommunication network 102.

The SIM level security services 114 may modify services that are provided to a mobile device based on the SIM card 120, regardless of whether the device is the mobile device 104. One of the SIM level security services 114 may modify a setting of the telecommunication network 102 to perform call forwarding 122, so that the incoming calls and/or text messages for the user 118 are routed to an alternative telephone number. For example, the alternative telephone number may be a telephone number of an alternative mobile device 124. In this way, the user 118 will not miss telephone calls due to the loss or theft of the mobile device 104. Another of the SIM level security services 114 may restrict incoming calls to and/or outgoing calls from any mobile device that is accessing the telecommunication network 102 through the SIM card 120. Likewise, an additional service of the SIM level security services 114 may block incoming text messages to and/or outgoing text messages from any mobile device that is accessing the telecommunication network 102 through the SIM card 120. The text messages may be short message service (SMS) messages. The SIM level security services 114 may also include remotely changing a locking state of the SIM card so that SIM card is protected by an authorization credential (e.g., the PIN). In this way, the SIM card 120 may cause a mobile device to prompt for the authorization credential prior to initiating a service that is available via the SIM card 120, as well as protect information stored on the SIM card 120 with the PIN.

In instances in which the client device 108 is a telecommunication carrier operated client device, the user 118 who loses the mobile device 104 may inform the service representative 116. In turn, the service representative 116 may use the client device 108 to configure the mobile security server 106 to perform device security services 112 and/or the SIM level security services 114. However, in other instances in which the user interface page provided by the mobile security server 106 is available to a client device operated by the user 118, the user 118 may use the user interface page to perform device security services 112 and/or the SIM level security services 114 without the involvement of the service representative 116. In still other instances, access to the SIM level security services 114 may be restricted to the telecommunication carrier operated client device 108, while the device security services 112 may be available to the user 118 for configuring the mobile device 104 from any client device, or vice versa.

Example Components

Figure 2:
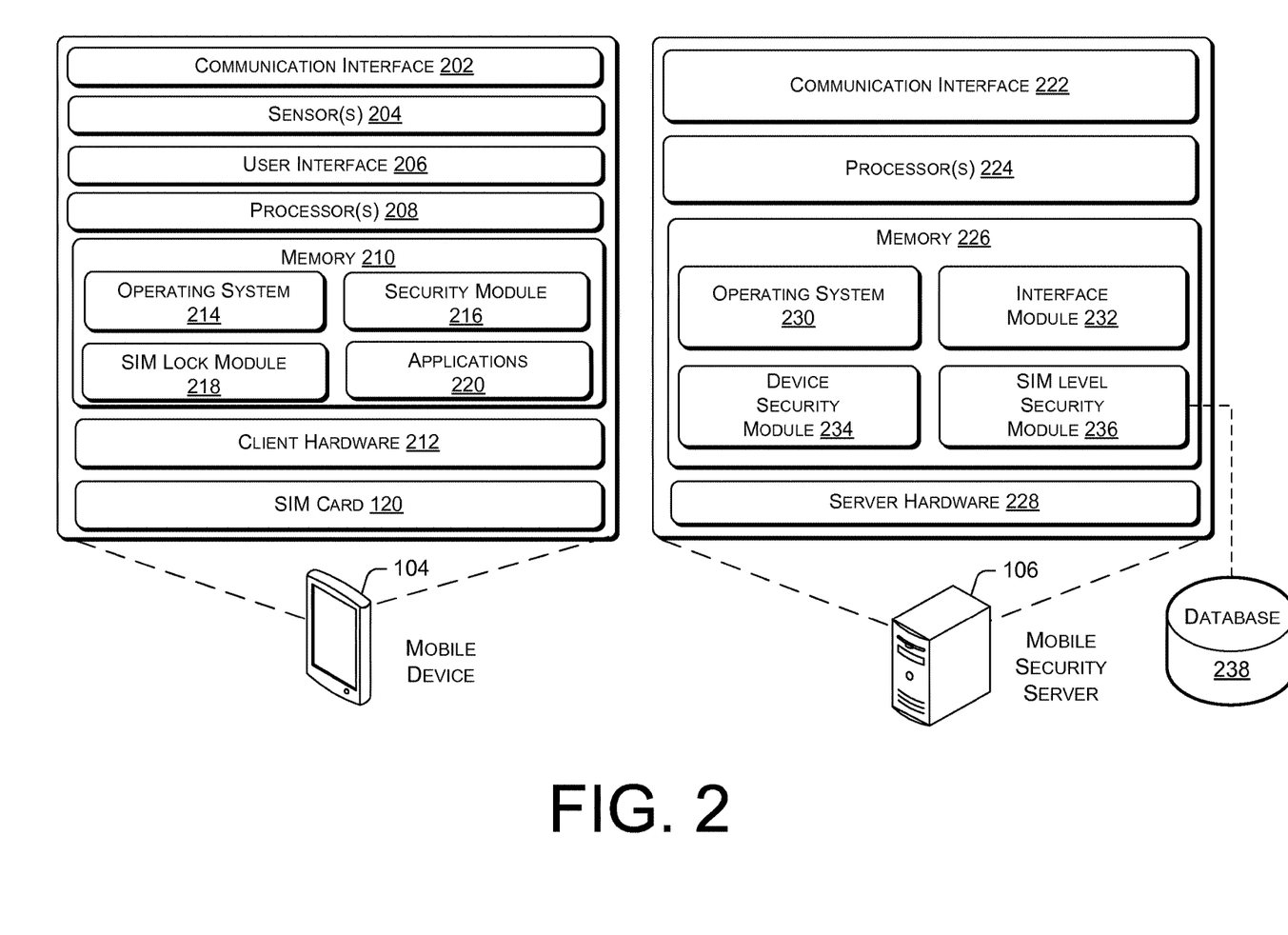
FIG. 2 is a block diagram that illustrates selected components of a mobile device and a mobile security server that provide SIM Level mobile security and mobile device level security.

FIG. 2 is a block diagram that illustrates selected components of the mobile device 104 and a mobile security server that provide SIM Level mobile security and mobile device level security. The mobile device 104 may include a communication interface 202, one or more sensors 204, a user interface 206, one or more processors 208, a memory 210, client hardware 212, and a SIM card 120. The communication interface 202 may include wireless and/or wired communication components that enable the electronic device to transmit or receive voice or data communication via the telecommunication network 102 or the Internet. The sensors 204 may include a proximity sensor, a compass, an accelerometer, and/or a global positioning system (GPS) sensor. The proximity sensor may detect movement of objects that are proximate the mobile device 104. The compass, the accelerometer, and the GPS sensor may detect orientation, movement, and geolocation of the mobile device 104.

The user interface 206 may enable a user to provide inputs and receive outputs from the mobile device 104. The user interface may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 210 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The client hardware 212 may include other hardware that is typically located in a mobile telecommunication device. For example, the client hardware 212 may include signal converters, antennas, hardware decoders and encoders, graphic processors, and/or the like that enable the mobile device 104 to execute applications and provide telecommunication functions.

The one or more processors 208 and the memory 210 of the mobile device 104 may implement an operating system 214, a security module 216, a SIM lock module 218, and one or more applications 220. The operating system 214 may include components that enable the mobile device 104 to receive and transmit data via various inputs (e.g., user controls, network interfaces, and/or memory devices), as well as process data using the one or more processors 208 to generate output. The operating system 214 may include a presentation component that presents the output (e.g., display the data on an electronic display, store the data in memory, transmit the data to another electronic device, etc.). Additionally, the operating system 214 may include other components that perform various additional functions generally associated with an operating system.

The security module 216 may implement one or more of the device security services 112 based on commands from the mobile security server 106. As described above, the device security services 112 may include activating the mobile device 104 to sound an audible alarm, reporting a current location of the mobile device 104 to the mobile security server 106, locking the user interface 206 of the mobile device 104, displaying a message on a display of the mobile device 104, or deleting data from pre-specified memory locations in the mobile device 104.

However, in some embodiments, the device security services 112 may include other supplemental actions. For example, the security module 216 may activate the mobile device 104 to perform at least one supplement action when one or more conditions are met. One condition is that the mobile device 104 is currently locked and an attempt to unlock the mobile device 104 is made. Another condition is that the one or more sensors 204, such as the accelerometer or the GPS sensor detects a change in the position of the mobile device 104. A third condition is that the proximity sensor detects movement close to the mobile device 104.

In one instance, a supplemental action may be automatically calling a predetermined telephone number. For example, the security module 216 may cause the mobile device 104 to call the user 118 of the mobile device at the alternative mobile device 124, so that the user 118 can attempt to speak with the person currently in possession of the mobile device 104. In another example, the security module 216 may cause the mobile device to call a loss prevention service that will attempt to speak with the person in possession of the mobile device 104 on behalf of the user 118.

In another instance, a supplemental action may be displaying information that indicates the nearest location for returning the mobile device 104. The security module 216 may select the nearest location from a location database in the mobile device 104 based on a current geolocation of the mobile device 104. The nearest location may be a storefront where the mobile device 104 may be returned to a service that eventually delivers the mobile device 104 back to the user 118.

In an additional instance, a supplemental action may be providing an option a display of the mobile device 104 that enables a person who is in possession of the mobile device 104 to input an address. Once the person has inputted the address, the person may input a command for the security module 216 to transmit the address to a pre-designated telephone number. The pre-designated phone number may belong to a loss prevention service or the user 118. In this way, the person in possession of the mobile device 104 may arrange for a location where the mobile device 104 may be returned to the loss prevention service or the user 118.

In some embodiments, the security module 216 may disable one or more capabilities of a mobile device as directed by a mobile security server 106. In one instance, the security module 216 may disable the power port and/or data port of a mobile device using software lockout. For example, the power port may be disabled so that a battery of the mobile device cannot be charged for further use. The data port of a mobile device may be disabled so that additional applications cannot be installed into a memory of the mobile device. In one instance, the security module 216 may disable a combination power/data port, such as a Universal Serial Bus (USB) port. Alternatively or concurrently, the security module 216 may be triggered by the mobile security server 106 to perform software lockouts that prevent the deletion or bypass of a lockout screen feature of the mobile device, or a software lockout that restricts a boot loader application on the mobile device so that new versions of the operating system cannot be loaded onto the mobile device.

The SIM lock module 218 may implement a SIM security service in the form of locking the SIM card. In such embodiment, the SIM lock module 218 may receive a command from the mobile security server 106 to lock the SIM card (e.g., SIM card 120) that is currently installed in the mobile device 104. The command may change a locking state of the SIM card to "on" such that the SIM card is protected by a pre-stored authorization credential (e.g., a pre-designated PIN). In this way, the SIM card may cause the mobile device 104 to prompt for the authorization credential prior to initiating services that are available via the SIM card 120.

The applications 220 may include applications that provide utility, entertainment, and/or productivity functionalities to a user of the mobile device 104. For example, the applications 220 may include electronic mail applications, remote desktop applications, web browser applications, navigation applications, office productivity applications, multimedia streaming applications, and/or so forth.

The mobile security server 106 may include a communication interface 222, one or more processors 224, a memory 226, and server hardware 228. The communication interface 222 may include wireless and/or wired communication components that enable the server to transmit data to and receive data from other networked devices via the network 110. The server hardware 228 may include additional hardware that performs user interface, data display, data communication, data storage, and/or other server functions.

The memory 226 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 224 and the memory 226 of the mobile security server 106 may implement an operating system 230. The operating system 230 may include components that enable the mobile security server 106 to receive and transmit data via various inputs (e.g., user controls, network interfaces, and/or memory devices), as well as process data using the one or more processors 224 to generate output. The operating system 230 may include a presentation component that presents the output (e.g., display the data on an electronic display, store the data in memory, transmit the data to another electronic device, etc.). Additionally, the operating system 230 may include other components that perform various additional functions generally associated with an operating system. The one or more processors 224 and the memory 226 of the mobile security server 106 may also implement an interface module 232, a device security module 234, and a SIM level security module 236.

The interface module 232 may enable an application on the client device 108 to interface with the device security module 234 and the SIM level security module 236. In some embodiments, the interface module 232 may generate one or more web pages for accessing functions of the device security module 234 and the SIM level security module 236. In other embodiments, the interface module 232 may provide a management application on the client device 108 with access to the functionalities of the device security module 234 and the SIM level security module 236 over the network 110.

The device security module 234 may provide device security services 112 to mobile devices, such as the mobile device 104. The device security services 112 may include sounding an alarm on a mobile device, obtaining a location of a mobile device, locking a mobile device, displaying a message on a mobile device, and/or deleting data stored in a mobile device. The device security services 112 may also include activating a mobile device to perform one or more supplemental actions or software lockouts. The software locks may disable hardware and/or software capabilities of the mobile device. In such instances, the device security module 234 may identify a mobile device by a device identifier that is stored in the memory of the mobile device and revealed to the telecommunication network 102, such as the International Mobile Station Equipment Identity (IMEI), during accessing of the telecommunication network 102 by the mobile device.

The SIM level security module 236 may provide SIM level security services 114 to mobile devices, such as the mobile device 104. The SIM level security module 236 may provide the SIM level security services 114 by modifying user settings that are associated with each SIM card. Such user settings may be stored in the core network of the telecommunication network 102. For example, the user settings for a SIM card of a particular user may be stored in a central database 238, e.g., a home location register (HLR), of the core network.

Accordingly, the SIM level security module 236 may modify a user setting associated with the SIM card 120 so that the incoming calls for the user 118 are routed to a different telephone number associated with an alternative mobile device 124. In this way, the user will not miss telephone calls due to the loss or theft of the mobile device 104. The SIM level security module 236 may also modify corresponding user settings to restrict incoming calls to and/or outgoing calls from a mobile device that is obtaining services from the telecommunication network 102 via the SIM card 120. As a result, incoming calls to the mobile device may go to voicemail, or alternatively cause a message to be conveyed to the incoming caller indicating that the called number is not available. Further, incoming calls to the mobile device do not trigger rings, vibrations, or other notifications of an incoming call on the mobile device. Likewise, attempts at making outgoing calls on the mobile device may result in failed calls and/or indications that network service is not available. In this way, attempts at impersonating the true user of the mobile device may be thwarted.

The SIM level security module 236 may also modify corresponding user settings to block incoming text messages to and/or outgoing text messages from a mobile device that is obtaining services from the telecommunication network 102 via the SIM card 120. The text messages may be in the form of SMS messages. As a result, an unauthorized user may not impersonate the true user of the mobile device or run up text message charges by sending text messages. Further, the unauthorized user may be denied access to incoming text messages that may contain sensitive or personal information of the true user of the mobile device.

The SIM level security module 236 may also change a locking state of the SIM card 120 by sending a locking message to a SIM locking module (e.g., SIM lock module 218) of a mobile device (e.g., mobile device 104). Accordingly, since the lock is on the SIM card 120 rather than a mobile device, placing the SIM card 120 in another mobile device will not cause any services to be accessible.

In some embodiments, the device security module 234 may be configured to determine whether one or more preconditions are met prior to implementing a device security service for a user. Alternatively or currently, the SIM level security module 236 may be configured to determine whether one or more such preconditions are met prior to implementing a SIM security service for a user. The preconditions may include an authentication of the user. For example, a security module on the mobile security server 108 may verify one or more authentication credentials of a user that is requesting a service prior to initiating the service. The authentication credentials may include information such as a user name, password, birth date, address, social security number, and/or so forth. The security module may verify that one or more inputted authentication credentials match corresponding authentication credentials stored in a data store for a user, such as the central database 238.

The preconditions may also include a financial status of the user. For example, a security module on the mobile security server 108 may verify that a user who is requesting a service for a mobile device and/or SIM card is current on payments to the telecommunication carrier that is operating the telecommunication network 102. The service module may carry out such financial verification by making a status request to a payment system operating by the telecommunication carrier. Accordingly, a server-side security module may grant a service request for the user when the payments of the user are current.

The preconditions may further include device capabilities of the mobile devices that are being affected. For example, a security module on the mobile security server 108 may initiate a service through a mobile device when a check of the hardware and/or software version of the mobile device indicates that the mobile device supports the operations of the security module.

The device security module 234 and the SIM level security module 236 may also have the ability to reverse any security service that is performed on a mobile device. Such reversion may be implemented when one or more post-conditions are met. The post-conditions may include the expiration of a predetermined time period. For example, the SIM level security module 236 may be configured to forward incoming calls to a mobile device 104 that has the SIM card 120 to the alternative mobile device 124 for a 24 hour period. Thus, the SIM level security module 236 may terminate the call forwarding at the end of the 24 hour period, and revert the corresponding setting to the original state. Similar reversions may also be implemented by the device security module 234 for a service (e.g., locking a mobile device) following the expiration of a predetermined time period.

The post-conditions may also include a server-side security module receiving a reversion command that is initiated at the client device 108 by the service representative 116 or the user 118. For example, the user 118 may call the service representative 116 to unlock the SIM card 120 so that a PIN is no longer required for accessing services or information stored in the SIM card 120. The service representative 116 may initiate a command to the SIM level security module 236 that unlocks the SIM card 120, provided that the service representative 116 is able to verify the identity of the user 118 over the phone. While the functions of the device security module 234 and the SIM level security module 236 are illustrated in FIG. 2, the functions are further discussed in FIG. 3.

Figure 3:
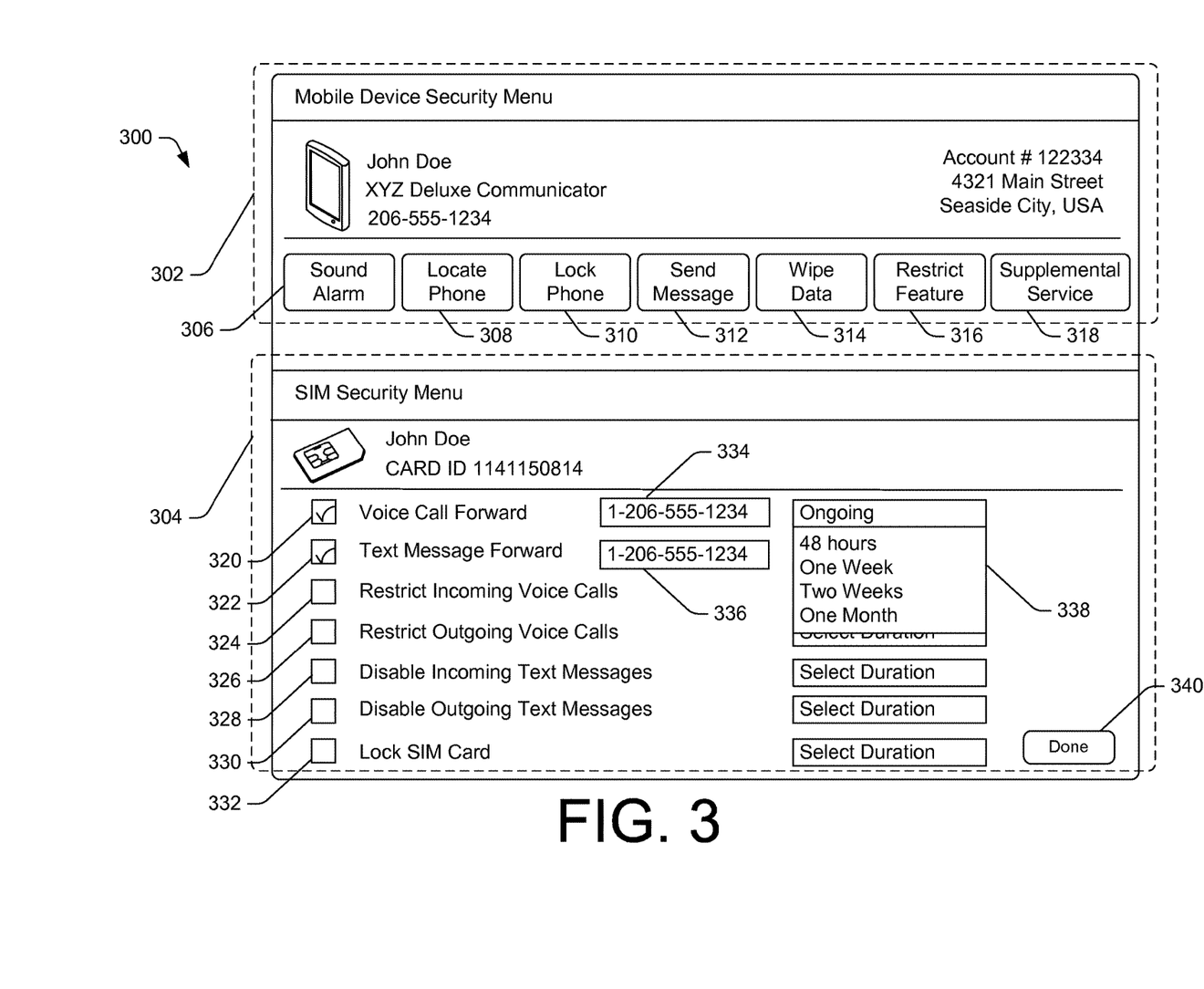
FIG. 3 shows an illustrative user interface page for modifying the SIM level mobile security settings and the mobile device level security settings.

FIG. 3 shows an illustrative user interface page 300 for modifying the SIM level mobile security settings and the mobile device level security settings. The user interface page 300 may be displayed by the client device 108. The user interface page 300 may include a mobile device security menu 302 and a SIM level security menu 304. The mobile device security menu 302 may display information regarding the user of a mobile device, such as the mobile device 104. For example, information such as mobile device brand and model, telephone number assigned to the mobile device, and personal information of the user may be displayed. The mobile device security menu 302 may also display menu options for triggering device security services 112.

The menu options may include a sound alarm option 306, a locate phone option 308, a lock phone option 310, a send message option 312, a wipe data option 314, a restrict feature option 316, and a supplemental service option 318. The sound alarm option 306 may be activated to trigger an audible alarm on the mobile device 104. The locate phone option 308 may be activated to trigger a geolocation of the mobile device 104, and the display of the geolocation on the mobile device 104. The lock phone option 310 may be activated to trigger a remote locking of the mobile device 104, such that features of the mobile device 104 may be accessed upon the input of authorized credentials into the mobile device 104. The send message option 312 may be activated to display a message composition user interface that enables a user to compose and send a message that is displayed on the mobile device 104. The wipe data option 314 may be activated to remotely trigger the deletion of information from pre-specified memory locations of the mobile device 104. The restrict feature option 316 may be activated to display a user interface page that enables a user to selectively disable software and/or hardware features of the mobile device, such as a power port or a boot loader. The supplemental service option 318 may be activated to display a user interface page that enables the user to configure the performance of supplemental actions. For example, the user interface page may enable the user to select one or more supplemental actions to be performed and one or more conditions that trigger these supplemental actions.

The SIM level security menu 304 may display information regarding a SIM card, such as the SIM card 120. For example, information that is displayed may include a serial number of the SIM card, the IMSI number stored in the SIM card, and/or the like. The SIM level security menu 304 may further include a voice call forward option 320, a text message forward option 322, a incoming call restriction option 324, a outgoing call restriction option 326, a disable incoming text messages option 328, a disable outgoing text message option 330, and a lock SIM card option 332. Each of these options may be activated and deactivated through the use of a corresponding toggle control, such as a checkbox. Further, each of these options may provide a security service with respect to the SIM card or a mobile device that is obtaining service from the telecommunication network 102 via the SIM card.

The voice call forward option 320 may be activated to route an incoming voice call that is destined for a mobile device with the SIM card 120 to an alternative telecommunication device. In various embodiments, the voice call forward option 320 may have a corresponding entry box 334 that a user may use to designate the phone number of the alternative telecommunication device. Likewise, the text message forward option 322 may be activated to route incoming text messages to an alternative telecommunication device. Accordingly, the text message forward option 322 may have a corresponding entry box 336 that a user may use to designate the phone number of the alternative telecommunication device.

The incoming call restriction option 324 may be activated to prevent incoming voice calls from reaching the mobile device. Likewise, the outgoing call restriction option 326 may be activate to prevent outgoing voice calls from being made from the mobile device. The disable incoming text message option 328 may be activated to prevent incoming text messages from reaching the mobile device. Likewise, the disable outgoing text message option 330 may be activated to prevent outgoing voice calls from being made from the mobile device. The lock SIM card option 332 may be activated to prevent a person who is in possession of the mobile device with the SIM card installed from accessing services from the telecommunication network 102 or access information stored in a SIM card without inputting a correct authentication credential.

In some embodiments, each of the SIM level security options may have a corresponding time period designation input field. Accordingly, the security services that are provide by the options may be automatically terminated at the end of the designated time period. For example, the voice call forward option 320 may have a time period selection control 338 that is used to designate the length of a time period. At the end of the time period, call forwarding to the alternative telephone number in the entry box 334 may be automatically suspended.

The various options in the mobile device security menu 302 and the SIM level security menu 304 may also be activated or deactivated based on the discretion of a user who has access to the user interface page 300. For example, if the user is a service representative, the service representative may activate or deactivate one or more options for a user of a mobile device following identity verification. However, in other embodiments, the activation of one or more of the options for a mobile device or a SIM card may be limited by the financial status of the user who is associated with the mobile device or the SIM card, and/or the device capabilities of the mobile device. Following the configuration of the options displayed in the user interface page 300, the execute button 340 may be used to submit the configured options to the mobile security server 106.

Example Operations

Figure 4:
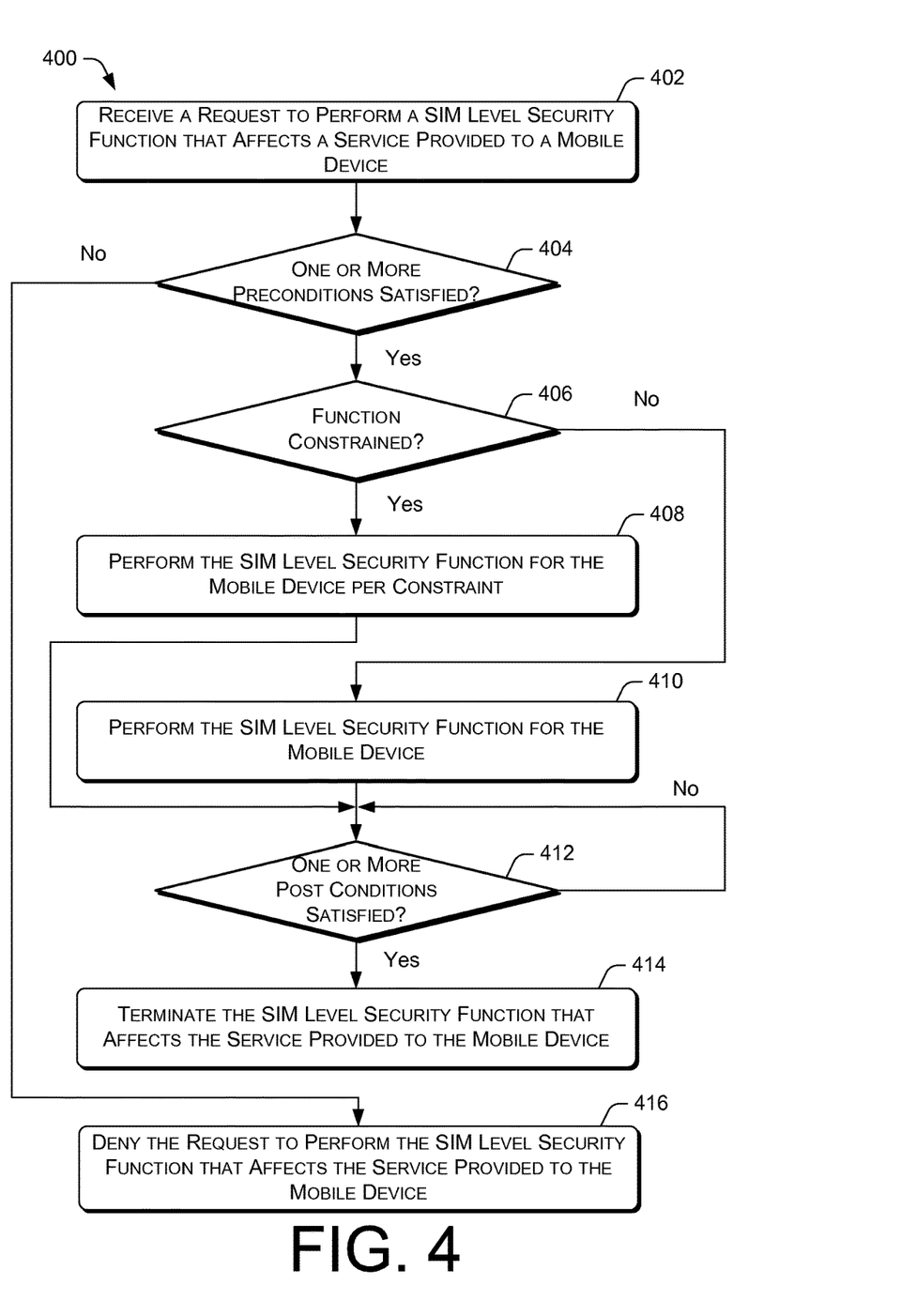
FIG. 4 shows a flow diagram of an example process for adjusting a SIM level security function for a mobile device.
Figure 5:
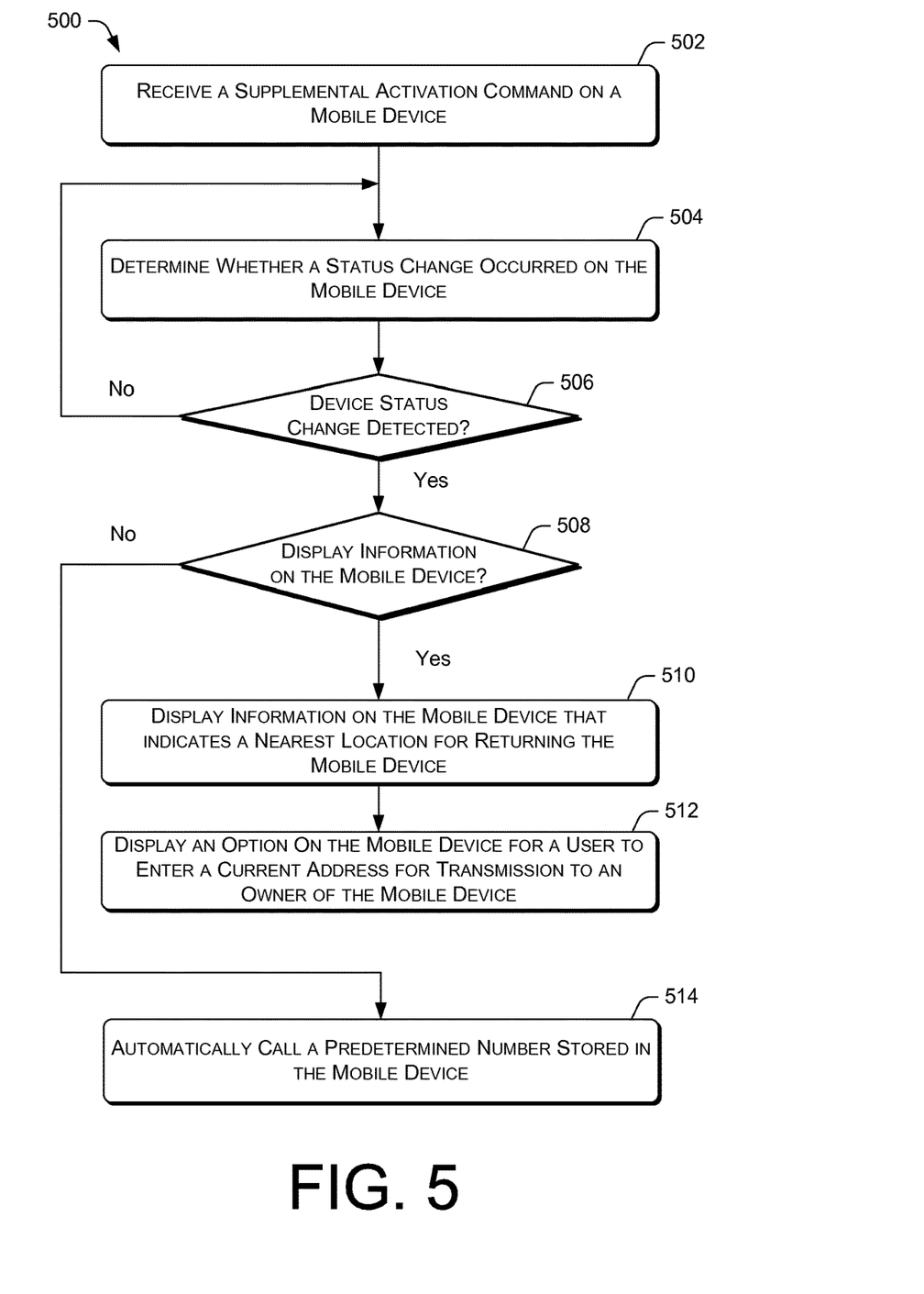
FIG. 5 shows a flow diagram of an example process for activating location features of a mobile device based on a service activation command.
Figure 6:
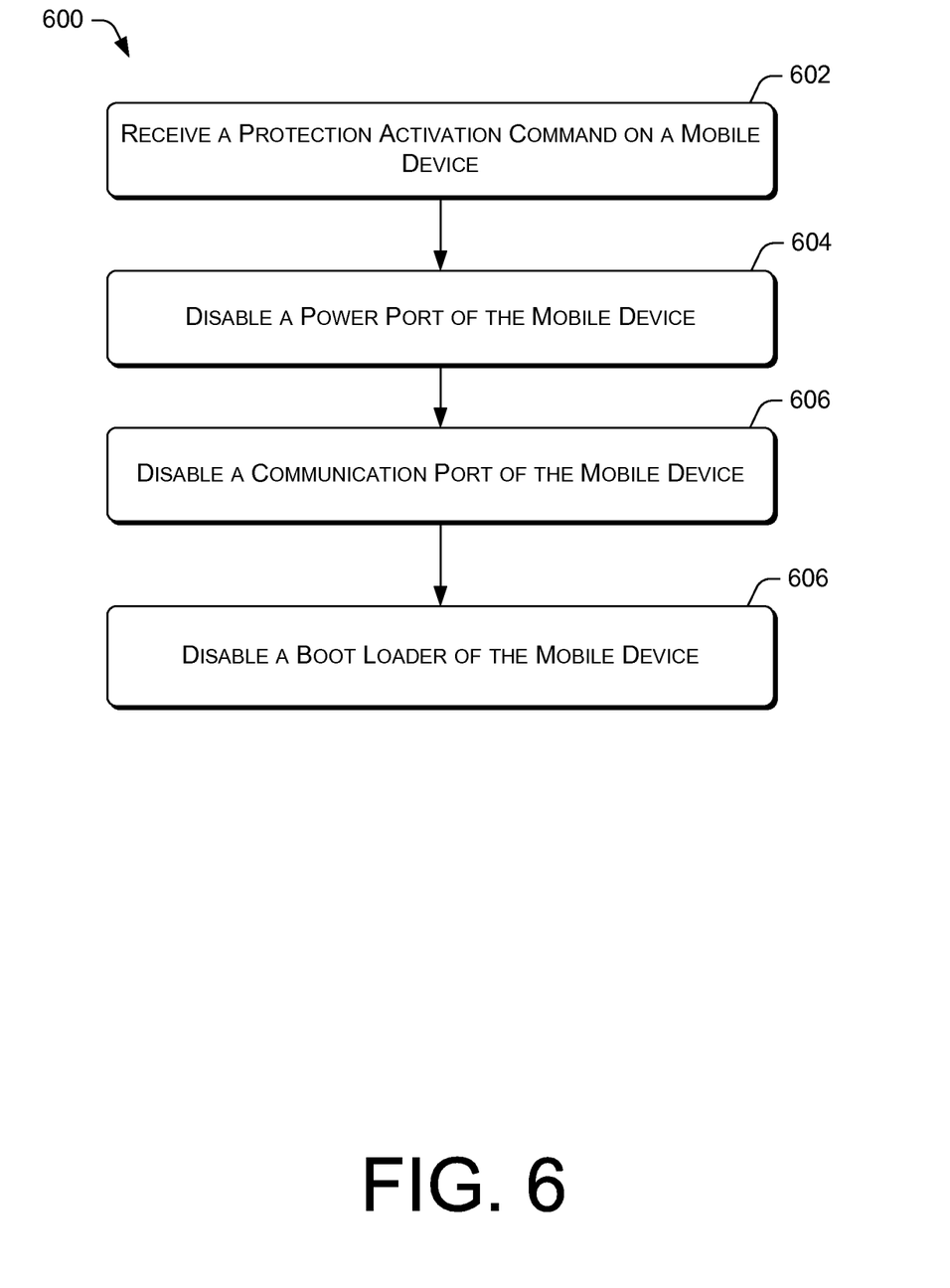
FIG. 6 shows a flow diagram of an example process for disabling features of a mobile device based on a protection activation command.

FIGS. 4-6 present illustrative processes 400-600 for implementing SIM level security services for a SIM card and device security services for a mobile device. Each of the processes 400-600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-600 are described with reference to the environment 100 of FIG. 1.

FIG. 4 shows a flow diagram of an example process 400 for adjusting a SIM level security function for a mobile device.

At block 402, the mobile security server 106 may receive a request to perform a SIM level security function that affects a service provided to a mobile device. The mobile device may be accessing services from the telecommunication network 102 via a SIM card, such as the SIM card 120. The request may be initiated at the client device 108 for a user of the mobile device. The initiation of the request may be due to the fact that the user has lost or misplaced the mobile device.

At decision block 404, the mobile security server 106 may determine whether one or more preconditions are satisfied for initiating the security function. A precondition may be that the user is current on payments to the telecommunication carrier that is operating the telecommunication network 102. Another precondition may be that the mobile device has the capability to support the SIM level security function. An additional precondition may be that the user is able to provide the correct authentication credentials. For example, the mobile security server 106 may verify the financial status of the user with a payment system of the telecommunication carrier. Thus, if the mobile security server 106 determines at decision block 404 that one or more preconditions are satisfied ("yes" at decision block 406), the process 400 may proceed to decision block 406.

At decision block 406, the mobile security server 106 may determine whether the performance of the SIM level function is constrained. For example, a constraint may be a time constraint that limits the duration of the security function (i.e., call forwarding) to a predetermined time period. Thus, if the mobile security server 106 determines that the performance of the SIM level function is constrained ("yes" at decision block 406), the process 400 may proceed to block 408.

At block 408, the mobile security server 106 may perform the SIM level security function per the constraint. For example, the mobile security server 106 may initiate call forwarding with respect to a SIM card with a limitation that the forwarding is to last a predetermined time period. However, if the mobile security server 106 determines that the performance of the SIM level function is not constrained ("no" at decision block 406), the process 400 may proceed to block 410. At block 410, the mobile security server 106 may perform the SIM level security function without any constraint. For example, the mobile security server 106 may initiate call forwarding with respect to a SIM card without any time limitation on the duration of the call forwarding.

At decision block 412, the mobile security server 106 may determine whether one or more post-conditions are satisfied. In various embodiments, a post-condition may be the expiration of a predetermined time period for the activation of the SIM level security function. Another post-condition is the reception of a reversion command that terminates the SIM level security function. For example, the service representative 116 may initiate a command that unlocks in the SIM card 120 at the client device 108, and the mobile security server 106 may in turn unlock the SIM card 120.

Thus, if the mobile security server 106 determines that one or more post-conditions are satisfied ("yes" at decision block 412), the process 400 may continue to block 414. At block 414, the mobile security server 106 may terminate the SIM level security function that affects the service provided to the mobile device. However, if the mobile security server 106 determines that the one or more post-conditions are not satisfied ("no" at decision block 412), the process 400 may loop back to block 414, so that another determination of whether one or more post-conditions are satisfied may be made by the mobile security server 106.

Returning to decision block 404, if the mobile security server 106 determines that one or more preconditions are not satisfied ("no" at decision block 404), the process 400 may continue to block 416. At block 416, the mobile security server 106 may deny the request to perform the SIM level security function that affects the service provided to the mobile device.

FIG. 5 shows a flow diagram of an example process 500 for activating location features of a mobile device based on a service activation command. At block 502, the mobile device (e.g., mobile device 104) may receive a supplement action command. The command may be initiated at the client device 108 for a user of the mobile device, and is forwarded to the mobile device by the mobile security server 106. The initiation of the request may be due to the fact that the user has lost or misplaced the mobile device.

At block 504, the mobile device may determine whether a status change occurred on the mobile device. In various embodiments, a status change may include a change in the geolocation of the mobile device, a detection of an attempt to unlock the mobile device, and/or a detected movement within a predetermined range of the mobile device. At decision block 506, if the mobile device determines that a status change occurred ("yes" at decision block 506), the process 500 may proceed to decision block 508.

At decision block 508, the mobile device may determine whether the activation command specified that the mobile device is to communicate with a person who is in possession of the mobile device. Thus, if the mobile device determines that the mobile device is to communicate with the person ("yes" at decision block 508), the process 500 may proceed to block 510.

At block 510, the mobile device may display information that indicates the nearest location to return the mobile device. For example, the nearest location may be a storefront operated by the telecommunication carrier that provides the telecommunication network 102. The mobile device 104 may obtain the nearest location based on the comparison of a geolocation of the mobile device to a database of locations stored in the mobile device.

At block 512, the mobile device may display an option on the mobile device that enables a person who is in possession of the mobile device to input an address. Once the person has inputted the address, the person may input a command for the security module 216 to transmit the address to a pre-designated telephone number. In alternative embodiments, the mobile device may perform one of the block 510 and block 512 in the alternative rather than concurrently.

Returning to decision block 506, if the mobile device determines that a status change did not occurred ("no" at decision block 506), the process 500 may loop back to block 504, so that the mobile device may continue to use the on-board sensors to monitor for status changes. Returning to decision block 508, if the mobile device determines that the mobile device is not to communicate with the person ("no" at decision block 508), the process 500 may proceed to block 514.

At block 514, the mobile device may automatically call a predetermined number stored in the mobile device. For example, the mobile device may call the user of the mobile device at an alternative telephone number, so that the user can attempt to speak with the person currently in possession of the mobile device.

FIG. 6 shows a flow diagram of an example process 600 for disabling features of a mobile device based on a protection activation command. At block 602, the mobile device (e.g., mobile device 104) may receive a protection action command. The command may be initiated at the client device 108 for a user of the mobile device, and is forwarded to the mobile device by the mobile security server 106. The initiation of the request may be due to the fact that the user has lost or misplaced the mobile device.

At block 604, the mobile device may disable a power port of the mobile device. The disablement of the power port may prevent a person who is currently in possession of the mobile device from charging the mobile device. At block 606, the mobile device may disable a data port of the mobile device. The disablement of the data port may prevent the installation of applications into the memory of the mobile device. At block 608, the mobile device may disable a boot loader of the mobile device. The disable of the boot loader may prevent upgrades or changes to the operating system of the mobile device. In alternative embodiments, the mobile device may perform at least one of the block 604-608 rather than every block of the blocks 604-608.

Accordingly, by using both the SIM level mobile security techniques and mobile device-based security techniques, a user of a lost or stolen mobile device may not only protect the lost or stolen hardware and the hardware-stored data, but also information that is stored in the SIM card. Further, the user may be further assured that the information stored in the SIM card cannot be used by a malicious user to access telecommunication network services or obtain additional sensitive data of the user.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. One or more non-transitory computer storage devices storing computer-executable instructions that, when executed, cause one or more processors to perform acts comprising:
    receiving a service request to perform a security function that affects a service provided to a mobile device by a telecommunication network,
        wherein the service is provided by the telecommunication network to the mobile device based on a subscriber identity module (SIM) card, and
        wherein the service request is responsive to a determination that the SIM card has been removed from another mobile device and a current user of the mobile device is attempting to use the SIM card to obtain the service from the telecommunication network without authorization;
    receiving a geolocation of the mobile device and locations included in a database of locations stored in the mobile device;
    determining, based at least in part on the geolocation and the locations, a nearest location for returning the mobile device;
    sending an activation command that triggers the mobile device to display information that indicates the nearest location for returning the mobile device;
    performing the security function that affects the service provided to the mobile device; and
    terminating the security function in response to receiving a reversion command or an expiration of a predetermined time period,
        wherein the security function includes forwarding, to an alternative telephone number, an incoming voice call or text message that is directed to the mobile device, and
        wherein the performing includes performing the security function in response to determining that at least one of a plurality of preconditions are satisfied, the plurality of preconditions including an authentication that a requester making the service request is an authorized user of the mobile device, a confirmation that the user is current on payments to a telecommunication carrier operating the telecommunication network, or that the mobile device supports the security function.

2. The one or more non-transitory computer storage devices of claim 1, wherein sending the activation command further triggers the mobile device to perform an action that is at least one of displaying an option for a user to enter a current address for transmission to an owner of the mobile device or calling a predetermined number stored in the mobile device.

3. The one or more non-transitory computer storage devices of claim 2, wherein the activation command triggers the mobile device to perform the action in response to the mobile device detecting at least one of a change in a geolocation of the mobile device, an attempt to unlock the mobile device, or a detected movement within a predetermined range of the mobile device.

4. The one or more non-transitory computer storage devices of claim 1, further comprising sending an additional activation command that triggers the mobile device to at least one of disable a power port of the mobile device to prevent charging of a battery of the mobile device, disable a communication port of the mobile device to prevent loading of applications into a memory of the mobile device, or disable a boot loader of the mobile device to prevent an updating of an operating system of the mobile device.

5. The one or more non-transitory computer storage devices of claim 1, further comprising sending an additional activation command that triggers the mobile device to sound an audible alarm, report a geolocation of the mobile device to a client device, lock the mobile device with an authentication credential, display a message, or delete data stored in a memory location of the mobile device.

6. The one or more non-transitory computer storage devices of claim 1, wherein the receiving includes receiving the service request from a client device that is operated by a service representative of the telecommunication network or an authorized user of the SIM card.

7. The one or more non-transitory computer storage devices of claim 1, wherein the security function further includes a locking of the SIM card.

8. The one or more non-transitory computer storage devices of claim 7, wherein the locking of the SIM card includes sending a locking command to the mobile device that triggers the SIM card to protect one or more services that are accessible through the SIM card or data stored in the SIM card with an authentication credential.

9. The one or more non-transitory computer storage devices of claim 1, wherein the security function further includes blocking of an incoming voice call that results in a routing of the incoming call to a voicemail service or providing a message to a caller making the incoming voice call that a telephone number associated with the SIM card is not available.

10. The one or more non-transitory computer storage devices of claim 1, wherein the request includes a time duration constraint on a performance of the security function, and wherein the performing including performing the security function according to the time duration constraint.

11. A computer-implemented method, comprising:
    receiving a service request to perform a security function at a security server,
        wherein the security function affects a service provided to a mobile device by a telecommunication network based on a subscriber identity module (SIM) card, and
        wherein the service request is responsive to a determination that the SIM card has been removed from another mobile device and a current user of the mobile device is attempting to use the SIM card to obtain the service from the telecommunication network without authorization;
    receiving a geolocation of the mobile device and locations included in a database of locations stored in the mobile device;
    determining, based at least in part on the geolocation and the locations, a nearest location for returning the mobile device;
    sending an activation command that triggers the mobile device to display information that indicates the nearest location for returning the mobile device;
    performing the security function that affects the service provided to the mobile device; and
    terminating the security function in response to an expiration of a predetermined time period,
        wherein the security function includes forwarding, to an alternative telephone number, an incoming voice call or text message that is directed to the mobile device, blocking an incoming voice call to or an outgoing voice call from the mobile device, or blocking an incoming text message to or an outgoing text message from the mobile device, and wherein the performing includes performing the security function in response to determining that at least one of a plurality of preconditions are satisfied, the plurality of preconditions including an authentication that a requester making the service request is an authorized user of the mobile device, a confirmation that the user is current on payments to a telecommunication carrier operating the telecommunication network, or that the mobile device supports the security function.

12. The computer-implemented method of claim 11, wherein sending the activation command further triggers the mobile device to perform an action that is at least one of displaying an option for an additional user to enter a current address for transmission to an owner of the mobile device or calling a predetermined number stored in the mobile device.

13. The computer-implemented method of claim 12, wherein the activation command triggers the mobile device to perform the action in response to the mobile device detecting at least one of a change in a geolocation of the mobile device, an attempt to unlock the mobile device, or a detected movement within a predetermined range of the mobile device.

14. The computer-implemented method of claim 12, wherein the activation command triggers automatically calling the predetermined number stored in the mobile device.

15. The computer-implemented method of claim 11, further comprising sending an additional activation command that triggers the mobile device to at least one of disable a power port of the mobile device to prevent charging of a battery of the mobile device, disable a communication port of the mobile device to prevent loading of applications into a memory of the mobile device, or disable a boot loader of the mobile device to prevent an updating of an operating system of the mobile device.

16. The computer-implemented method of claim 11, further comprising sending an additional activation command that triggers the mobile device to sound an audible alarm, report a geolocation of the mobile device to the client device, lock the mobile device with an authentication credential, display a message, or delete data stored in a memory location of the mobile device.

17. A mobile device, comprising:
one or more processors;
a subscriber identity module (SIM) card; and
memory that includes a plurality of computer-executable components comprising:
a locking component that locks the SIM card installed on the mobile device in response to a locking command from a security server of a telecommunication network; and
a security component that performs actions in response to an activation command from the security server, the actions including:
at least one of disabling a communication port of the mobile device to prevent loading of applications into the memory of the mobile device or disabling a boot loader of the mobile device to prevent an updating of an operating system of the mobile device,
at least one of forwarding, to an alternative telephone number, an incoming voice call or text message that is directed to the mobile device, blocking an incoming voice call to or an outgoing voice call from the mobile device, or blocking an incoming text message to or an outgoing text message from the mobile device, and
displaying information that indicates a nearest location for returning the mobile device, the nearest location being determined in part by providing a geolocation of the mobile device and locations that are stored in a database of the mobile device to the security server;
wherein the security component performing the actions in response to determining that at least one of a plurality of preconditions are satisfied, the plurality of preconditions including an authentication that a requester making the service request is an authorized user of the mobile device, a confirmation that the user is current on payments to a telecommunication carrier operating the telecommunication network, or that the mobile device supports the security function,
wherein the mobile device is configured to determine that the SIM card has been removed from another mobile device and a current user of the mobile device is attempting to use the SIM card to obtain service from the telecommunication network without authorization and to request a security function of the security server.

18. The mobile device of claim 17, wherein the security component further performs an additional action in response to detecting at least one of a change in a geolocation of the mobile device, an attempt to unlock the mobile device, or a detected movement within a predetermined range of the mobile device, the additional action including displaying an option for a user to enter a current address for transmission to an owner of the mobile device or calling a predetermined number stored in the mobile device.

* * * * *